(12) United States Patent
Liao et al.

(10) Patent No.: US 7,641,212 B1
(45) Date of Patent: Jan. 5, 2010

(54) BICYCLE FRAME WHOSE AXLE PEG HAS A NON-ROTATABLE FUNCTION

(76) Inventors: Wu-Hsiung Liao, 1F, No. 3, Lane 71, Sec. 2, Liming Rd., Nantun District, Taichung City (TW); Mei-Ling Chen, 11F, No. 2, Lane 874, Sec. 2, Zhongshan Rd., Changhua City, Changhua County (TW)

( * ) Notice: Subject to any disclaimer, the term of this patent is extended or adjusted under 35 U.S.C. 154(b) by 241 days.

(21) Appl. No.: 11/751,825

(22) Filed: May 22, 2007

(51) Int. Cl.
*B62J 25/00* (2006.01)
(52) U.S. Cl. ........................ 280/293; 280/165
(58) Field of Classification Search ............... 280/293, 280/163, 165
See application file for complete search history.

(56) References Cited

U.S. PATENT DOCUMENTS

| | | | | |
|---|---|---|---|---|
| 6,149,177 A | * | 11/2000 | Valdez | 280/291 |
| 6,199,887 B1 | * | 3/2001 | Lee | 280/291 |
| 6,247,761 B1 | * | 6/2001 | Lin | 301/124.1 |
| 6,499,378 B1 | * | 12/2002 | Ho | 74/564 |
| 6,783,143 B1 | * | 8/2004 | Hung | 280/291 |
| 7,182,360 B2 | * | 2/2007 | Paasch et al. | 280/291 |
| 7,458,596 B1 | * | 12/2008 | Serna | 280/291 |

* cited by examiner

*Primary Examiner*—Kevin Hurley
(74) *Attorney, Agent, or Firm*—Alan Kamrath; Kamrath & Associates PA (57) ABSTRACT

A bicycle frame includes an axle, a hub and freewheel assembly, two fork end members, two axle pegs, and two locking nuts. Thus, the first ramp of each of the axle pegs is rested on the second ramp of the respective fork end member to prevent each of the axle pegs from being rotatable relative to the respective fork end member, so that the first end of each of the axle pegs is clamped exactly between the respective fork end member and the respective locking nut to prevent each of the axle pegs from being rotatable freely on the axle to ensure the safety of a user who treads the axle pegs.

17 Claims, 10 Drawing Sheets

BICYCLE FRAME WHOSE AXLE PEG HAS A NON-ROTATABLE FUNCTION

BACKGROUND OF THE INVENTION

1. Field of the Invention

The present invention relates to a bicycle frame and, more particularly, to a front or rear bicycle frame.

2. Description of the Related Art

Figure 9:
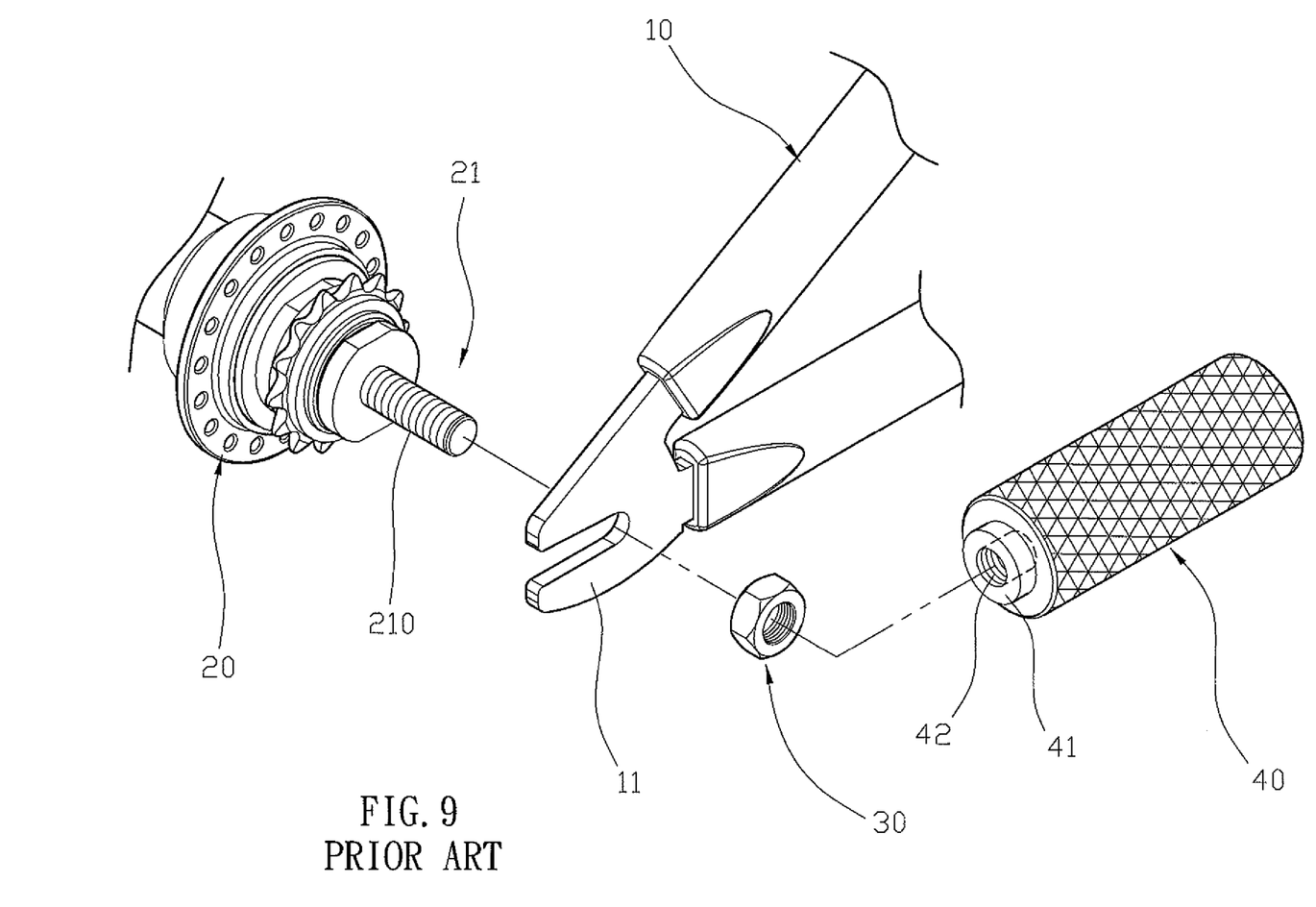
FIG. 9 is an exploded perspective view of a conventional bicycle frame in accordance with the prior art.
Figure 10:
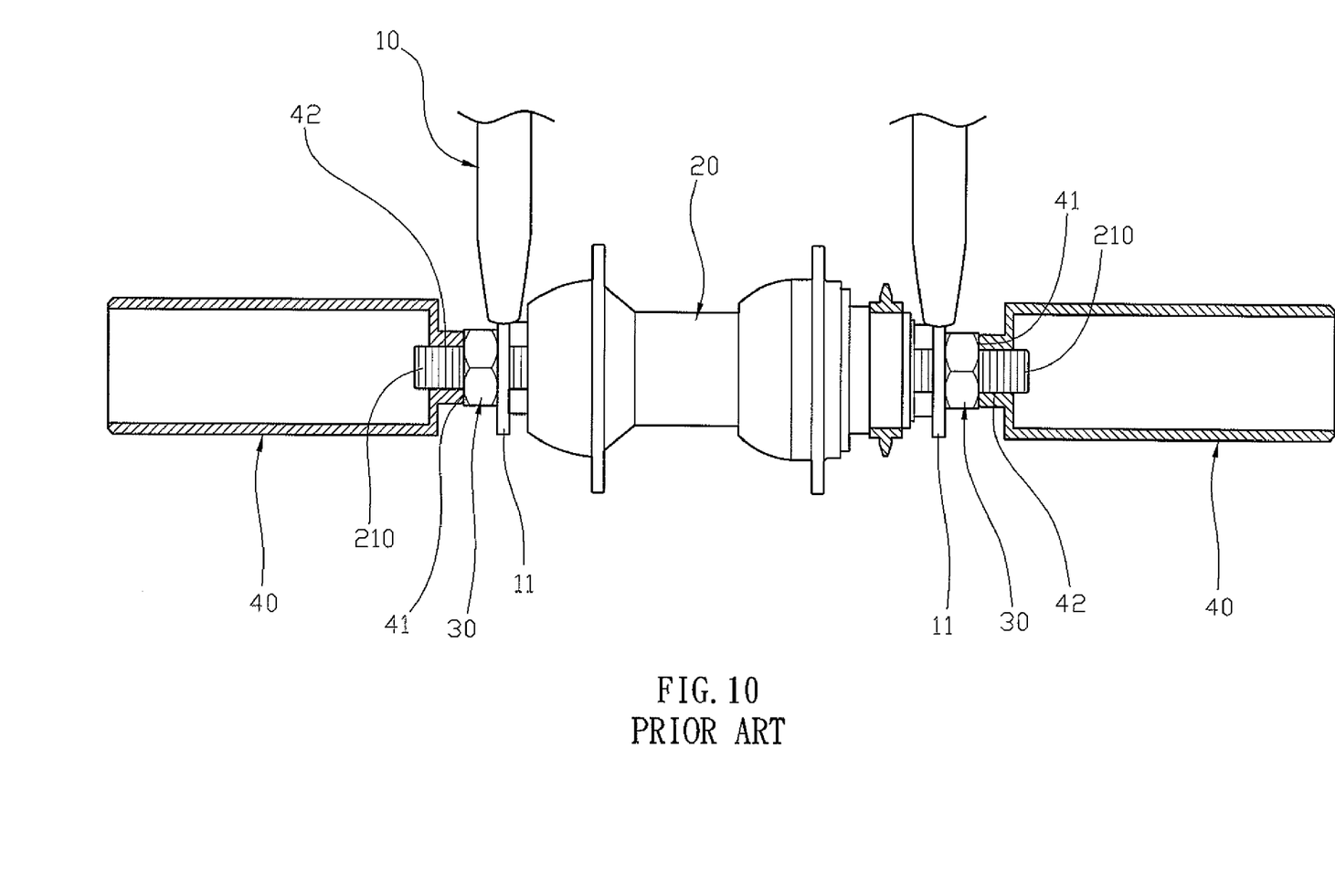
FIG. 10 is a top cross-sectional assembly view of the conventional bicycle frame as shown in FIG. 9.
Figure 11:
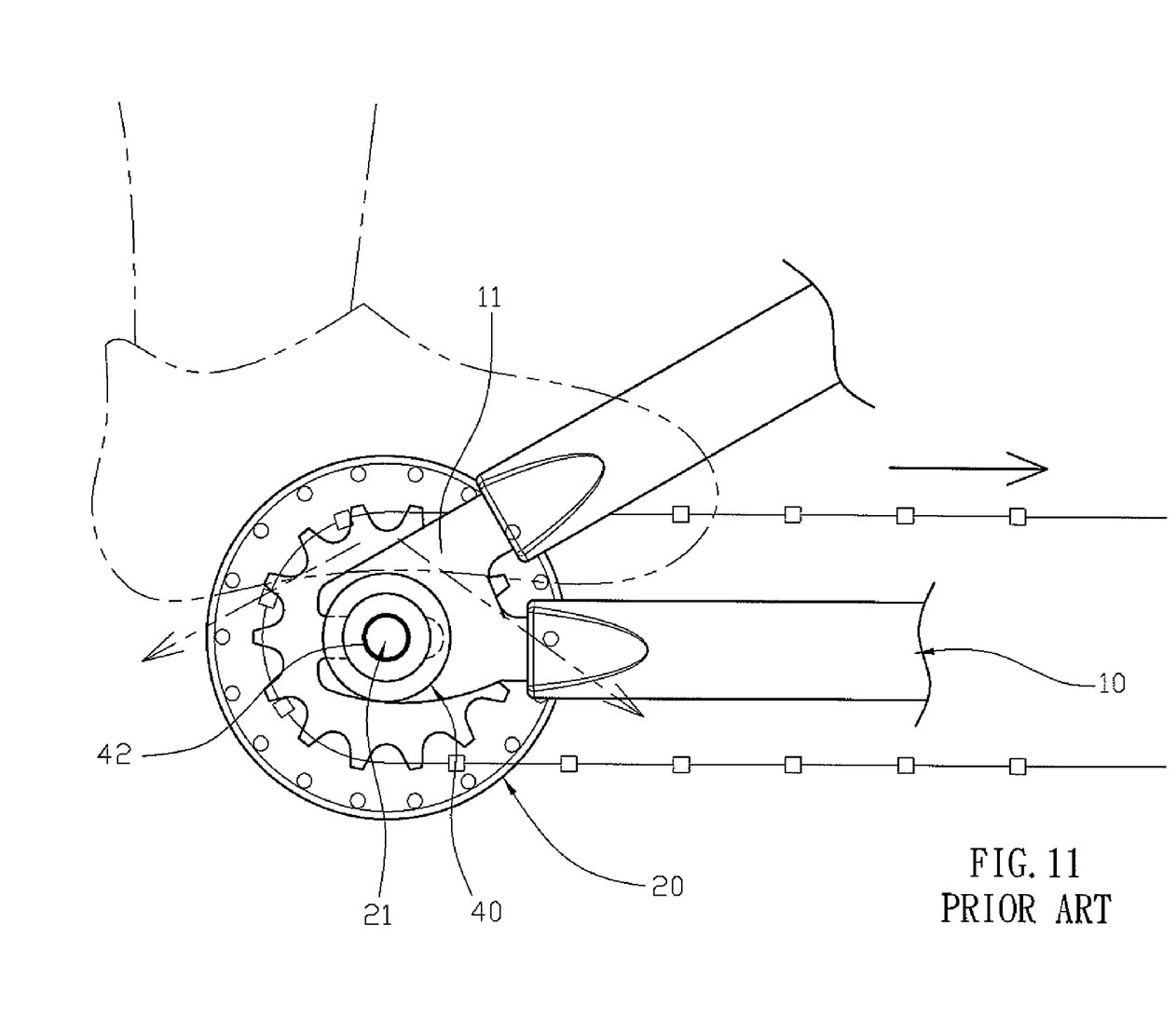
FIG. 11 is a schematic side assembly view of the conventional bicycle frame as shown in FIG. 9.

A conventional bicycle frame in accordance with the prior art shown in FIGS. 9-11 comprises an axle 21 having two opposite threaded ends 210, a hub and freewheel assembly 20 rotatably mounted on the axle 21, two fork end members 11 each mounted on a respective threaded end 210 of the axle 21 and each rested on the hub and freewheel assembly 20, two locking nuts 30 each screwed onto a respective threaded end 210 of the axle 21 and each rested on a respective fork end member 11, and two axle pegs 40 each having an end portion which is formed with a screw bore 42 screwed onto a respective threaded end 210 of the axle 21 and is provided with a protruding plane 41 rested on a respective locking nut 30. Each of the fork end members 11 is connected to a front fork or a rear stay 10 of the bicycle. Thus, each of the axle pegs 40 is rotatable relative to the axle 21 so that the screw bore 42 of each of the axle pegs 40 is screwed onto the respective threaded end 210 of the axle 21 to attach each of the axle pegs 40 onto the axle 21 or unscrewed from the respective threaded end 210 of the axle 21 to remove each of the axle pegs 40 from the axle 21.

However, each of the axle pegs 40 is easily rotatable relative to the axle 21 when a rotation force is applied on each of the axle pegs 40, thereby causing danger to a user who treads the axle pegs 40. In addition, when the screw bore 42 of each of the axle pegs 40 is screwed onto the respective threaded end 210 of the axle 21 to an excessive extent, each of the axle pegs 40 cannot be removed from the axle 21 easily, thereby causing inconvenience to the user in disassembly of each of the axle pegs 40. Further, when the screw bore 42 of each of the axle pegs 40 is screwed onto the respective threaded end 210 of the axle 21 to an excessive extent, each of the fork end members 11 is easily distorted or deformed.

BRIEF SUMMARY OF THE INVENTION

In accordance with the present invention, there is provided a bicycle frame, comprising an axle having two opposite threaded ends, a hub and freewheel assembly rotatably mounted on the axle, two fork end members each mounted on a respective threaded end of the axle and each having a first side rested on the hub and freewheel assembly, two axle pegs each mounted on a respective threaded end of the axle and each having a first end provided with a first ramp rested on a second side of a respective fork end member, and two locking nuts each screwed onto a respective threaded end of the axle and each rested on the first end of a respective axle peg to push the first ramp of the respective axle peg toward the respective fork end member.

The primary objective of the present invention is to provide a bicycle frame whose axle peg has a non-rotatable function.

Another objective of the present invention is to provide a bicycle frame, wherein the first ramp of each of the axle pegs is rested on the second ramp of the respective fork end member to prevent each of the axle pegs from being rotatable relative to the respective fork end member, so that the first end of each of the axle pegs is clamped exactly between the respective fork end member and the respective locking nut to prevent each of the axle pegs from being rotatable freely on the axle to ensure the safety of a user who treads the axle pegs.

A further objective of the present invention is to provide a bicycle frame, wherein each of the axle pegs is not screwed onto the respective threaded end of the axle, so that each of the axle pegs will not be tightened onto or loosened from the respective threaded end of the axle, thereby facilitating assembly and disassembly of each of the axle pegs.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a bicycle frame in accordance with the preferred embodiment of the present invention comprises an axle 61 having two opposite threaded ends 610, a hub and freewheel assembly 60 rotatably mounted on the axle 61, two fork end members 51 each mounted on a respective threaded end 610 of the axle 61 and each having a first side 54 rested on the hub and freewheel assembly 60, two axle pegs 80 each mounted on a respective threaded end 610 of the axle 61 and each having a first end 85 provided with a first ramp 81 rested on a second side of a respective fork end member 51, and two locking nuts 70 each screwed onto a respective threaded end 610 of the axle 61 and each rested on the first end of a respective axle peg 80 to push the first ramp 81 of the respective axle peg 80 toward the respective fork end member 51.

The hub and freewheel assembly 60 is located between the fork end members 51.

Each of the fork end members 51 is connected to a front fork or a rear stay 50 of the bicycle and clamped between the hub and freewheel assembly 60 and the first ramp 81 of the respective axle peg 80. The second side of each of the fork end members 51 is provided with a second ramp 52 rested on the first ramp 81 of the respective axle peg 80.

The first ramp 81 of each of the axle pegs 80 and the second ramp 52 of each of the fork end members 51 are directed toward two opposite inclined directions and have the same inclination so that the first ramp 81 of each of the axle pegs 80 and the second ramp 52 of each of the fork end members 51 are complementary with each other. The first ramp 81 of each of the axle pegs 80 and the second ramp 52 of each of the fork end members 51 are inclined relative to a perpendicular direction of an axial direction of the axle 61 so that the first ramp 81 of each of the axle pegs 80 and the second ramp 52 of each of the fork end members 51 are non-perpendicular to the axle 61.

Each of the axle pegs 80 has a hollow inside formed with a chamber 83 and has an open second end 86 connected to the chamber 83. The first end 85 of each of the axle pegs 80 has a central portion formed with a smooth passage 82 to allow passage of the respective threaded end 610 of the axle 61. The first end 85 of each of the axle pegs 80 is clamped between the respective fork end member 51 and the respective locking nut 70 and has a protruding first side 87 provided with the first ramp 81 and a second side 88 connected to the chamber 83 and rested on the respective locking nut 70.

Each of the threaded ends 610 of the axle 61 is extended through the passage 82 into the chamber 83 of the respective axle peg 80.

Each of the locking nuts 70 is fully hidden in the chamber 83 of the respective axle peg 80.

Accordingly, the first ramp 81 of each of the axle pegs 80 is rested on the second ramp 52 of the respective fork end member 51 to prevent each of the axle pegs 80 from being rotatable relative to the respective fork end member 51, so that the first end 85 of each of the axle pegs 80 is clamped exactly between the respective fork end member 51 and the respective locking nut 70 to prevent each of the axle pegs 80 from being rotatable freely on the axle 61 to ensure the safety of a user who treads the axle pegs 80. In addition, each of the axle pegs 80 is not screwed onto the respective threaded end 610 of the axle 61, so that each of the axle pegs 80 will not be tightened onto or loosened from the respective threaded end 610 of the axle 61, thereby facilitating assembly and disassembly of each of the axle pegs 80.

Figure 1:
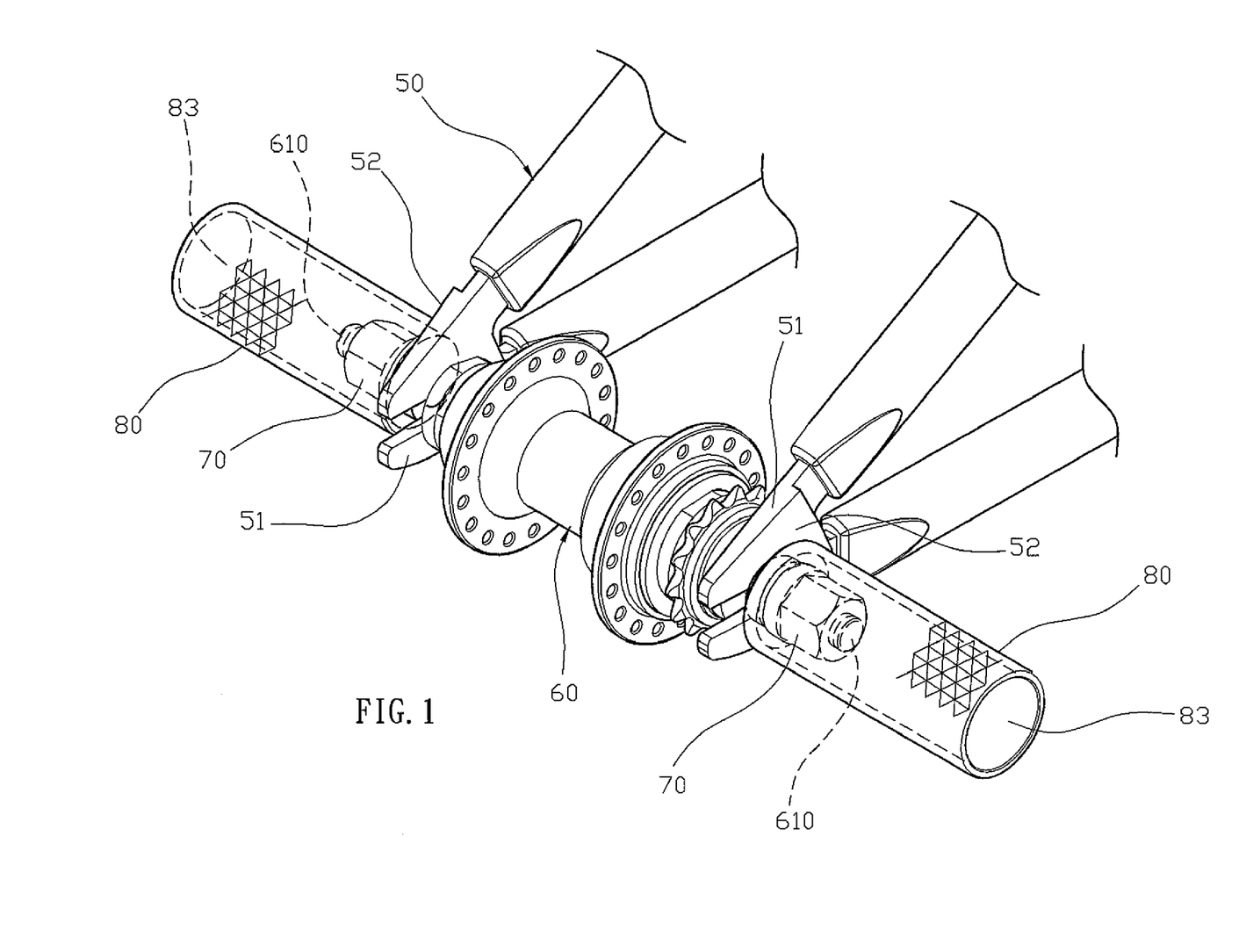
FIG. 1 is a perspective view of a bicycle frame in accordance with the preferred embodiment of the present invention.
Figure 2:
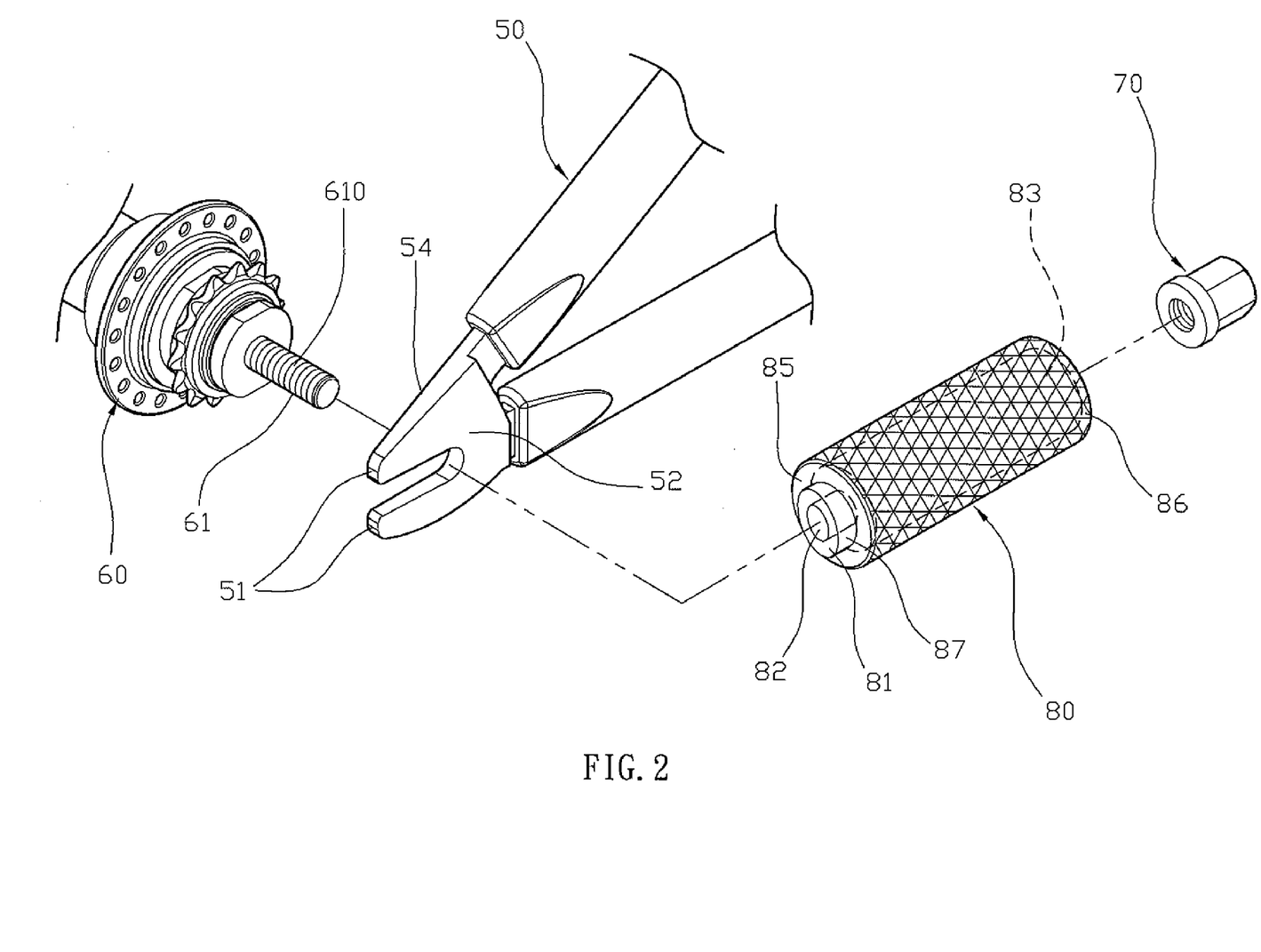
FIG. 2 is an exploded perspective view of the bicycle frame as shown in FIG. 1.
Figure 3:
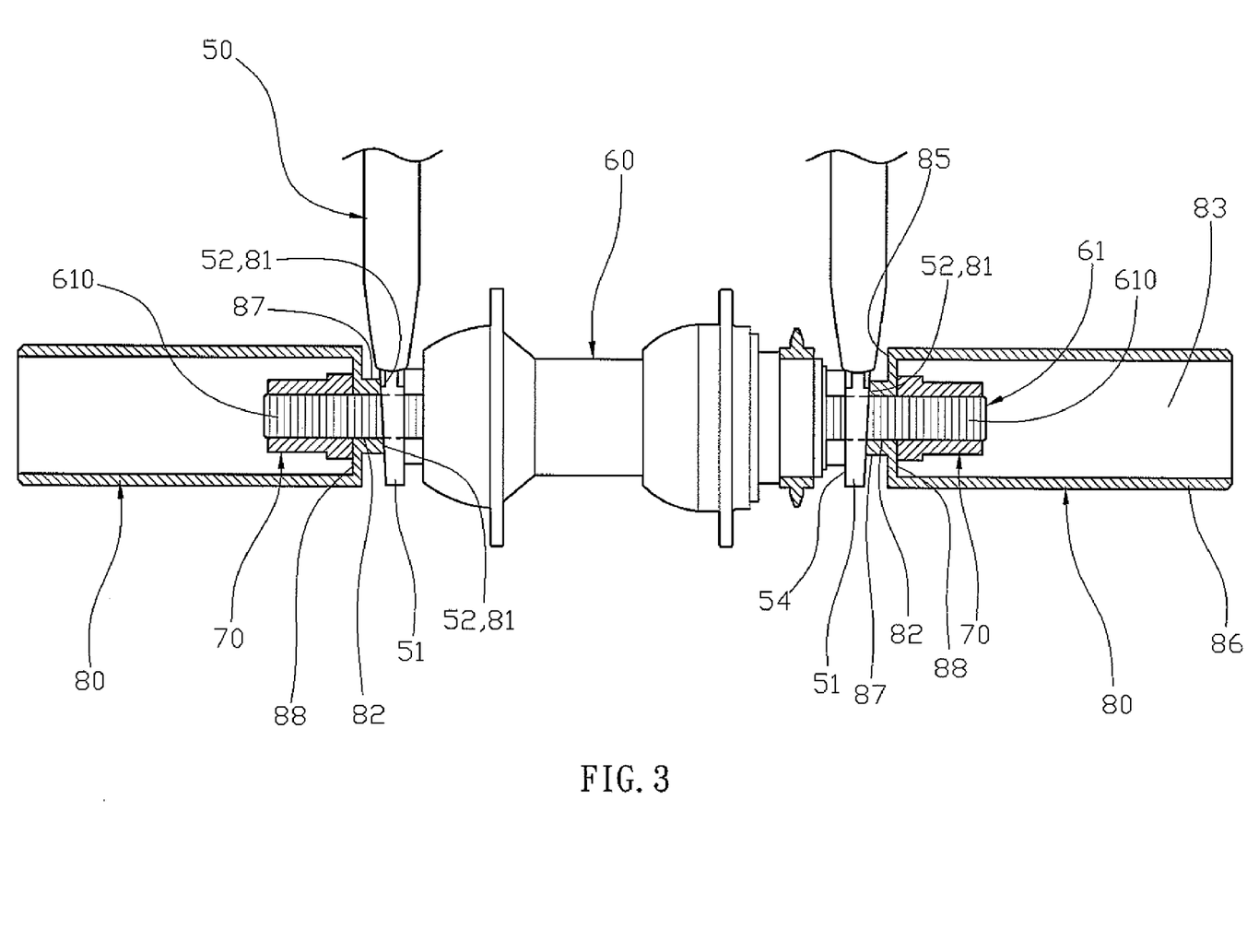
FIG. 3 is a top cross-sectional view of the bicycle frame as shown in FIG. 1.
Figure 4:
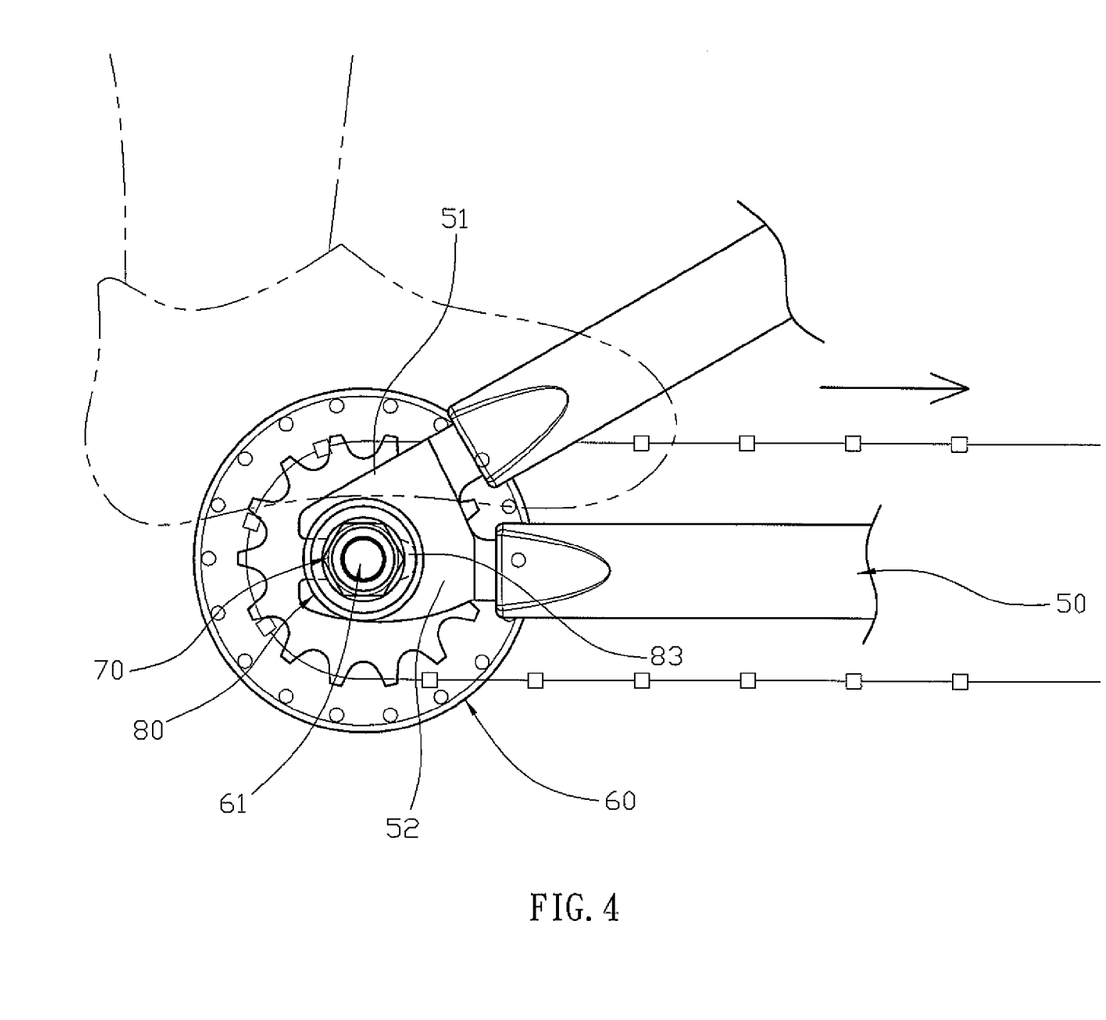
FIG. 4 is a schematic side view of the bicycle frame as shown in FIG. 1.
Figure 5:
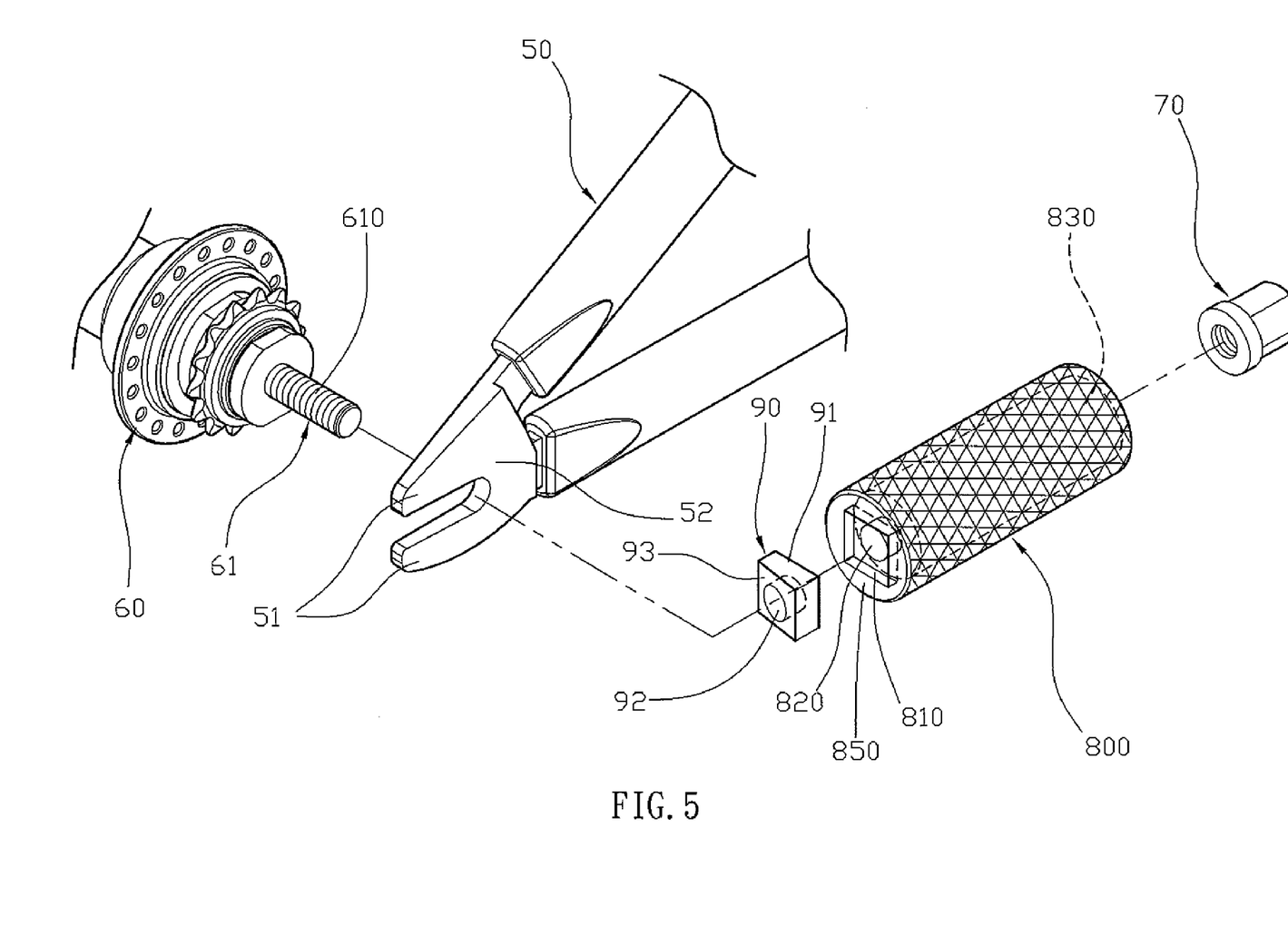
FIG. 5 is an exploded perspective view of a bicycle frame in accordance with another preferred embodiment of the present invention.
Figure 6:
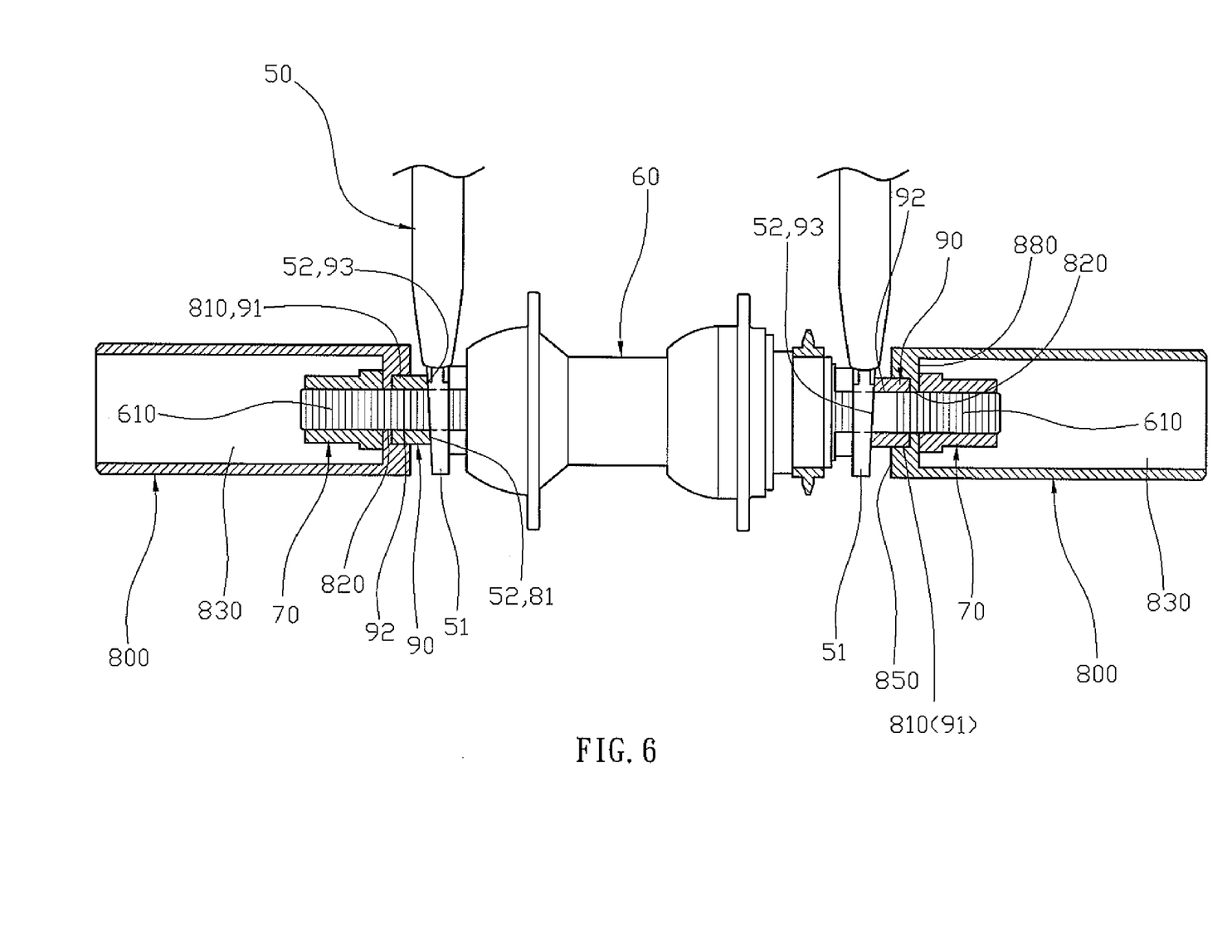
FIG. 6 is a top cross-sectional assembly view of the bicycle frame as shown in FIG. 5.

Referring to FIGS. 5 and 6, the bicycle frame further comprises two press blocks 90 each mounted on the first end 850 of the respective axle peg 800 and each provided with the first ramp 93. The first end 850 of each of the axle pegs 800 has a central portion formed with a smooth passage 820 to allow passage of the respective threaded end 610 of the axle 61 and has a first side formed with a non-circular locking hole 810 connected to the passage 820 and a second side 880 rested on the respective locking nut 70. Each of the press blocks 90 has a central portion formed with a smooth channel 92 to allow passage of the respective threaded end 610 of the axle 61 and has a first side formed with a non-circular locking portion 91 locked in the locking hole 810 of the respective axle peg 800 and a second side provided with the first ramp 93. Each of the threaded ends 610 of the axle 61 is extended through the passage 820 into the chamber 830 of the respective axle peg 800.

Figures 7, 8:
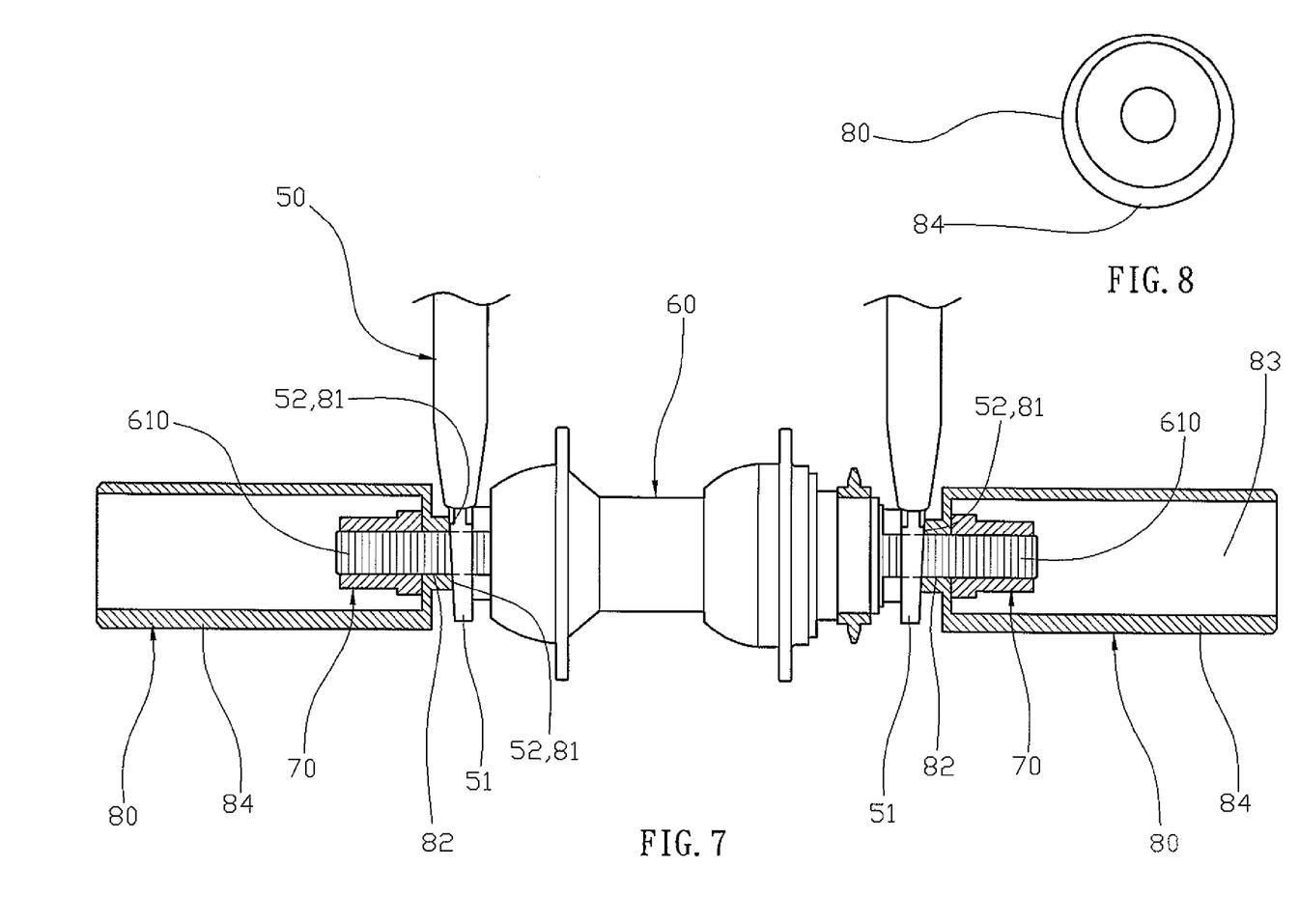
FIG. 7 is a top cross-sectional assembly view of a bicycle frame in accordance with another preferred embodiment of the present invention.
FIG. 8 is a side view of an axle peg of the bicycle frame as shown in FIG. 7.

Referring to FIGS. 7 and 8, each of the axle pegs 80 has a periphery formed with a reinforcement 84 which is arranged eccentrically about a central portion of each of the axle pegs 80 to enhance the strength of each of the axle pegs 80.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle frame, comprising:
   an axle having two opposite threaded ends;
   a hub and freewheel assembly rotatably mounted on the axle;
   two fork end members each mounted on a respective threaded end of the axle and each having a first side rested on the hub and freewheel assembly;
   two axle pegs each mounted on a respective threaded end of the axle and each having a first end provided with a first ramp rested on a second side of a respective fork end member;
   two locking nuts each screwed onto a respective threaded end of the axle and each rested on the first end of a respective axle peg to push the first ramp of the respective axle peg toward the respective fork end member;
   wherein the second side of each of the fork end members is provided with a second ramp rested on the first ramp of the respective axle peg;
   the first ramp of each of the axle pegs and the second ramp of each of the fork end members are directed toward two opposite inclined directions and have the same inclination so that the first ramp of each of the axle pegs and the second ramp of each of the fork end members are complementary with each other.

2. The bicycle frame in accordance with claim 1, wherein each of the axle pegs has a hollow inside formed with a chamber.

3. The bicycle frame in accordance with claim 2, wherein each of the axle pegs has an open second end connected to the chamber.

4. The bicycle frame in accordance with claim 2, wherein the first end of each of the axle pegs has a central portion formed with a smooth passage to allow passage of the respective threaded end of the axle.

5. The bicycle frame in accordance with claim 4, wherein each of the threaded ends of the axle is extended through the passage into the chamber of the respective axle peg.

6. The bicycle frame in accordance with claim 1, wherein:
   the first end of each of the axle pegs is clamped between the respective fork end member and the respective locking nut;
   each of the fork end members is clamped between the hub and freewheel assembly and the first ramp of the respective axle peg.

7. The bicycle frame in accordance with claim 2, wherein the first end of each of the axle pegs has a protruding first side provided with the first ramp and a second side connected to the chamber and rested on the respective locking nut.

8. The bicycle frame in accordance with claim 2, wherein each of the locking nuts is fully hidden in the chamber of the respective axle peg.

9. The bicycle frame in accordance with claim 1, wherein the first ramp of each of the axle pegs is rested on the second ramp of the respective fork end member to prevent each of the axle pegs from being rotatable relative to the respective fork end member and from being rotatable on the axle.

10. The bicycle frame in accordance with claim 1, wherein the hub and freewheel assembly is located between the fork end members.

11. The bicycle frame in accordance with claim 1, further comprising two press blocks each mounted on the first end of the respective axle peg and each provided with the first ramp.

12. The bicycle frame in accordance with claim 11, wherein the first end of each of the axle pegs has a central portion formed with a smooth passage to allow passage of the respective threaded end of the axle.

13. The bicycle frame in accordance with claim 12, wherein:
   the first end of each of the axle pegs has a first side formed with a non-circular locking hole connected to the passage and a second side rested on the respective locking nut;
   each of the press blocks has a first side formed with a non-circular locking portion locked in the locking hole of the respective axle peg and a second side provided with the first ramp.

14. The bicycle frame in accordance with claim 11, wherein each of the press blocks has a central portion formed with a smooth channel to allow passage of the respective threaded end of the axle.

15. The bicycle frame in accordance with claim 12, wherein:
   each of the axle pegs has a hollow inside formed with a chamber;
   each of the threaded ends of the axle is extended through the passage into the chamber of the respective axle peg.

16. A bicycle frame comprising:
   an axle having two opposite threaded ends;
   a hub and freewheel assembly rotatably mounted on the axle;
   two fork end members each mounted on a respective threaded end of the axle and each having a first side rested on the hub and freewheel assembly;
   two axle pegs each mounted on a respective threaded end of the axle and each having a first end provided with a first ramp rested on a second side of a respective fork end member;
   two locking nuts each screwed onto a respective threaded end of the axle and each rested on the first end of a respective axle peg to push the first ramp of the respective axle peg toward the respective fork end member;
   wherein the second side of each of the fork end members is provided with a second ramp rested on the first ramp of the respective axle peg;
   the first ramp of each of the axle pegs and the second ramp of each of the fork end members are inclined relative to a perpendicular direction of an axial direction of the axle so that the first ramp of each of the axle pegs and the second ramp of each of the fork end members are non-perpendicular to the axle.

17. A bicycle frame, comprising:
   an axle having two opposite threaded ends;
   a hub and freewheel assembly rotatable mounted on the axle;
   two fork end members each mounted on a respective threaded end of the axle and each having a first side rested on the hub and freewheel assembly;
   two axle pegs each mounted on a respective threaded end of the axle and each having a first end provided with a first ramp rested on a second side of a respective fork end member;
   two locking nuts each screwed onto a respective threaded end of the axle and each rested on the first end of a respective axle peg to push the first ramp of the respective axle peg toward the respective fork end member;
   wherein each of the axle pegs has a periphery formed with a reinforcement to enhance the strength of each of the axle pegs;
   the reinforcement is arranged eccentrically about a central portion of each of the axle pegs.

* * * * *